(12) United States Patent
Sofan et al.

(10) Patent No.: US 11,473,475 B2
(45) Date of Patent: Oct. 18, 2022

(54) HOLDING DEVICE FOR AN INJECTION VALVE OF AN EXHAUST-GAS BURNER, AND EXHAUST-GAS BURNER

(71) Applicant: Dr. Ing. h.c. F. Porsche Aktiengesellschaft, Stuttgart (DE)

(72) Inventors: Uli Sofan, Esslingen (DE); Marcel Noe, Königsbach-Stein (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/463,758

(22) Filed: Sep. 1, 2021

(65) Prior Publication Data
US 2022/0112830 A1 Apr. 14, 2022

(30) Foreign Application Priority Data
Oct. 13, 2020 (DE) ..................... 10 2020 126 775.4

(51) Int. Cl.
| | |
|---|---|
| *F01N 3/36* | (2006.01) |
| *F01N 3/38* | (2006.01) |
| *F01N 3/20* | (2006.01) |
| *F01N 3/025* | (2006.01) |

(52) U.S. Cl.
CPC ................. *F01N 3/36* (2013.01); *F01N 3/38* (2013.01); *F01N 3/0256* (2013.01); *F01N 3/2033* (2013.01); *F01N 2240/14* (2013.01); *F01N 2260/024* (2013.01); *F01N 2610/03* (2013.01); *F01N 2610/11* (2013.01); *F01N 2610/1453* (2013.01)

(58) Field of Classification Search
CPC .......... F01N 3/36; F01N 3/38; F01N 2610/03; F01N 2610/11; F01N 2610/1453; F01N 2240/14; F01N 2260/024; F01N 3/0256; F01N 3/2033; Y02A 50/20; Y02A 10/12
See application file for complete search history.

(56) References Cited

U.S. PATENT DOCUMENTS

| | | | | |
|---|---|---|---|---|
| 5,605,042 | A | * | 2/1997 | Stutzenberger .... B01D 53/9431 60/301 |
| 6,539,708 | B1 | | 4/2003 | Hofmann et al. |
| 7,168,241 | B2 | | 1/2007 | Rudelt et al. |
| 8,006,487 | B2 | * | 8/2011 | Gaiser ..................... F01N 3/025 60/299 |
| 9,453,448 | B2 | | 9/2016 | Levin et al. |

(Continued)

FOREIGN PATENT DOCUMENTS

| | | | |
|---|---|---|---|
| DE | 2621884 | * | 12/1977 |
| DE | 19806265 C1 | | 7/1999 |

(Continued)

*Primary Examiner* — Phutthiwat Wongwian
*Assistant Examiner* — Diem T Tran
(74) *Attorney, Agent, or Firm* — RatnerPrestia

(57) ABSTRACT

A holding device for an injection valve of an exhaust-gas burner of a motor vehicle includes a receiving section and a cooling-water jacket. The receiving section is shaped such that it can receive a front end of the injection valve. The cooling-water jacket extends around the receiving section and is shaped such that, after the holding device has been mounted on the exhaust-gas burner, the cooling-water jacket, together with a corresponding cooling-water jacket of the exhaust-gas burner, forms a cooling-water chamber of the exhaust-gas burner.

10 Claims, 1 Drawing Sheet

(56) References Cited

U.S. PATENT DOCUMENTS

Figure 1:
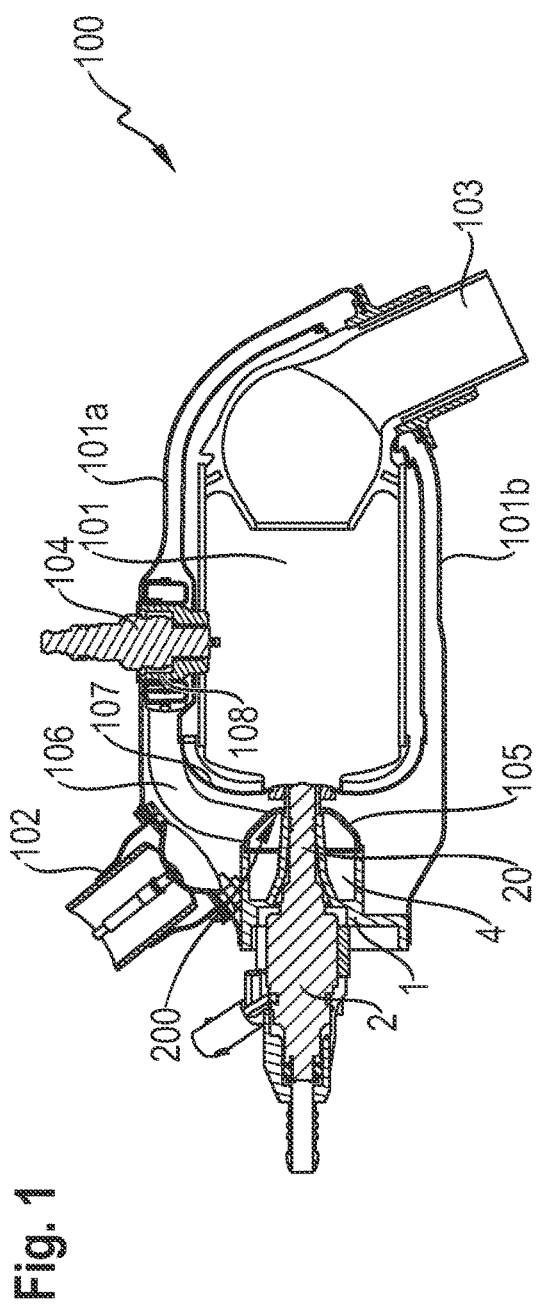

2013/0126644 A1    5/2013  Popovich
2016/0230998 A1*  8/2016  Frish ........................ F23R 3/283
2018/0363530 A1  12/2018  Caulkins et al.

FOREIGN PATENT DOCUMENTS

| DE | 102004015805 A1 | 11/2005 |
| --- | --- | --- |
| DE | 102013204189 A1 | 9/2013 |
| DE | 112012004851 T5 | 9/2014 |
| DE | 112018003017 T5 | 6/2020 |

\* cited by examiner

HOLDING DEVICE FOR AN INJECTION VALVE OF AN EXHAUST-GAS BURNER, AND EXHAUST-GAS BURNER

CROSS-REFERENCE TO RELATED APPLICATION

This application claims priority to German Patent Application No.: 10 2020 126 775.4, filed Oct. 13, 2020, the content of such application being incorporated by reference herein in its entirety.

FIELD OF THE INVENTION

The present invention relates to a holding device for an injection valve of an exhaust-gas burner. According to a further aspect, the present invention relates to an exhaust-gas burner for a motor vehicle, comprising a housing which, in its interior, defines a combustion chamber and has an inlet line and an outlet line which are fluidically connected to the combustion chamber, wherein, during the operation of the exhaust-gas burner, a fluid, in particular process air, flows into the combustion chamber through the inlet line, an injection valve which opens into the combustion chamber and by means of which a defined fuel quantity is injected with a defined injection frequency into the combustion chamber during the operation of the exhaust-gas burner, a holding device for the injection valve, by means of which holding device the injection valve is held, and an ignition device which extends into the combustion chamber and which is configured to ignite and thus burn the fuel-fluid mixture, in particular the fuel-process air mixture, within the combustion chamber, wherein the gas formed during this combustion process flows through the outlet line and passes out of the exhaust-gas burner.

BACKGROUND OF THE INVENTION

Exhaust-gas burners of the above-stated type are commonly used in exhaust-gas treatment devices of motor vehicles in order to improve the emissions values. During operation, such exhaust-gas burners increase the temperature of the exhaust gas in order to thus trigger reactions which occur only when a certain temperature threshold is reached and which contribute to the purification of the exhaust gas. For example, soot accumulations in or blockages of a particle filter of the exhaust-gas treatment device can be removed by means of an exhaust-gas burner.

DE 11 2018 003 017 T5, DE 11 2012 004 851 T5 and DE 10 2013 204 189 A1, which are each incorporated herein by reference, disclose different embodiments of fuel injection nozzles or dosing devices for injecting fluids into a combustion chamber. These are however not used in exhaust-gas burners.

SUMMARY OF THE INVENTION

Described herein is a holding device for an injection valve of an exhaust-gas burner of the type stated in the introduction, which holding device is easy and inexpensive to produce and allows the injection valve to be securely held and cooled effectively. Also described is an exhaust-gas burner for a motor vehicle having a correspondingly improved holding device for the injection valve.

A holding device according to aspects of the invention for an injection valve of an exhaust-gas burner of a motor vehicle comprises a receiving section, which is shaped such that it can receive a front end of the injection valve, and a cooling-water jacket, which extends around the receiving section and which is shaped such that, after the holding device has been mounted on the exhaust-gas burner, said cooling-water jacket, together with a corresponding cooling-water jacket of the exhaust-gas burner, forms a cooling-water chamber of the exhaust-gas burner. The holding device according to aspects of the invention advantageously allows the injection valve to be securely held and cooled effectively.

In a preferred embodiment, it is proposed that the cooling-water jacket of the holding device has two partitions which are formed such that the cooling-water jacket is divided by means of the two partitions into two spaces with flow transfer. The two partitions may in particular extend outward in a radial direction from the receiving section. In alternative embodiments, it is also possible for the cooling-water jacket to have only one partition or more than two partitions.

In a particularly preferred embodiment, it is proposed that the holding device is formed as a cast part. It is thus possible for a holding device to be manufactured relatively easily and thus also inexpensively even in the case of a relatively complex component geometry.

In a particularly advantageous embodiment, the holding device may have two cooling-water line connection means for the connection of two external cooling-water lines, wherein the cooling-water line connection means preferably each comprise a sealing surface which is formed in particular as an O-ring carrier. In an alternative embodiment, the holding device may also be configured with only one connection for a burner-external cooling-water line if the other cooling-water line is led through the housing of the exhaust-gas burner at another position.

In one advantageous embodiment, it is provided that the holding device has, in encircling fashion, a substantially fully freestanding welding edge of thin-walled form. This encircling welding edge advantageously prevents distortion of the seat geometry of the injection valve and of the sealing surfaces, which are formed in particular as O-ring carriers, during the welding-on of a housing of the exhaust-gas burner.

In one advantageous refinement, it may be provided that, at an inner end of the receiving section, there is formed an annular shoulder which, together with an encircling wall adjoining said shoulder, forms a structural space reserve for receiving an outer acoustic or thermal shielding means for the injection valve. This acoustic shielding means, or thermal shielding means, may for example be formed as a shielding cap which is produced from an acoustic foam or from a thermally insulating material and which extends in certain sections around the injection valve. In an alternative embodiment, a holding device with a fully acoustically decoupled injection valve is also conceivable. This may be achieved for example through the introduction of an elastomer layer between the injection valve and the holding device, which elastomer layer is, in functional terms, similar to the formation of a rubber-metal bearing.

In a preferred embodiment, it may be provided that the holding device has two connection means for the connection of two burner-internal water lines of an ignition-plug cooling element of the exhaust-gas burner. Effective cooling of the ignition-plug cooling element of the exhaust-gas burner is achieved in this way. In an alternative embodiment, the holding device may also be configured with only one connection for a burner-internal water line if the other water line is led through the housing of the exhaust-gas burner at another position.

In one advantageous embodiment, it is proposed that the exhaust-gas burner has a cooling-water jacket which, together with the corresponding cooling-water jacket of the holding device, forms a cooling-water chamber of the exhaust-gas burner.

In a particularly advantageous embodiment, it may be provided that the holding device is, in the region of a front end of the injection valve, arranged with a sliding fit relative to a firmly fixed guide grille of the exhaust-gas burner.

BRIEF DESCRIPTION OF THE DRAWING FIGURES

Figure 3:
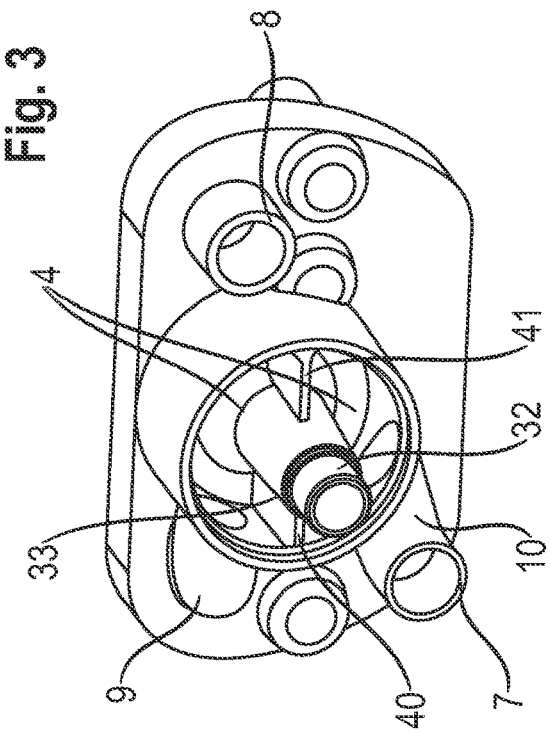
Figure 2:
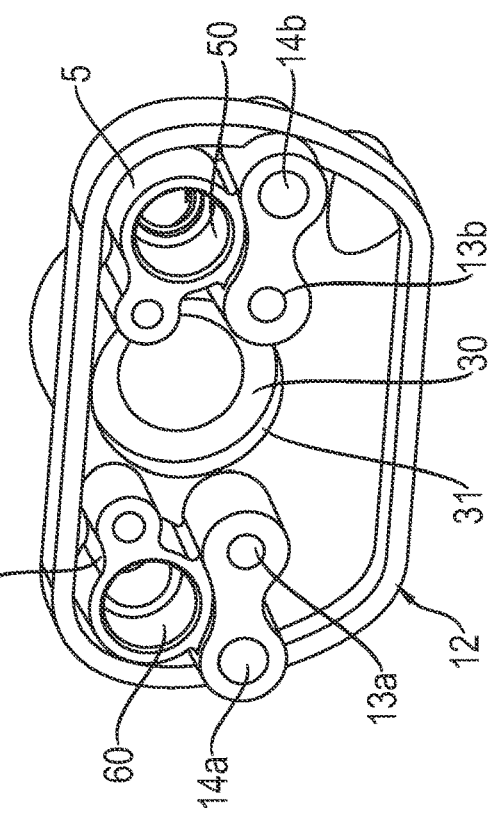

Further features and advantages of the present invention will become clear from the following description of a preferred exemplary embodiment with reference to the accompanying FIGS, in which:

FIG. 1 is a partially sectional illustration of an exhaust-gas burner for a motor vehicle with a holding device for an injection valve of the exhaust-gas burner, FIG. 2 shows a perspective view of the holding device, FIG. 3 shows a further perspective view of the holding device.

DETAILED DESCRIPTION OF THE INVENTION

Referring to FIG. 1, an exhaust-gas burner 100 for a motor vehicle comprises a housing 101, which in the exemplary embodiment shown here is formed by two connected-together outer shells 101a, 101b and which, in its interior, defines a combustion chamber. The exhaust-gas burner 100 furthermore has an inlet line 102 and an outlet line 103 which are fluidically connected to the combustion chamber, wherein, during the operation of the exhaust-gas burner 100, a fluid, in particular process air, flows into the combustion chamber through the inlet line 102.

Furthermore, the exhaust-gas burner 100 comprises an injection valve 2, which opens into the combustion chamber and by means of which, during the operation of the exhaust-gas burner 100, a defined fuel quantity is injected with a defined injection frequency, or continuously, with a defined fuel pressure into the combustion chamber, and a holding device 1 for the injection valve 2, by means of which holding device the injection valve 2 is held on the exhaust-gas burner 1. Details of the holding device 1 will be discussed in more detail further below.

Furthermore, the exhaust-gas burner 100 has an ignition device 104, in the present case in the form of an ignition plug, which extends into the combustion chamber and which is configured to ignite and thus burn the fuel-fluid mixture, in particular the fuel-process air mixture, within the combustion chamber, wherein the gas formed during this combustion process flows through the outlet line 103 and thus passes out of the exhaust-gas burner 100.

By means of the exhaust-gas burner 100, it is possible to increase the temperature of the exhaust gas of an internal combustion engine of the motor vehicle in order to thus trigger reactions which occur only when a certain temperature threshold is reached and which contribute to the purification of the exhaust gas. For example, it is also possible for soot accumulations in or blockages of a particle filter of an exhaust-gas treatment device of a motor vehicle, into which the exhaust-gas burner 100 is integrated, to be removed by means of the exhaust-gas burner 100.

Referring to FIGS. 2 and 3, further details of the holding device 1 for the injection valve 2 of the exhaust-gas burner 100 will be discussed in more detail below.

The holding device 1 is preferably formed as a cast part, such that it can be produced relatively easily and thus also inexpensively even in the case of a relatively complex component geometry. As can be seen in FIG. 2, the holding device 1 has a receiving section 3 which is shaped such that it can receive a front end 20 of the injection valve 2. At an inner end of the receiving section 3, there is formed an annular shoulder 30 which, together with an encircling wall 31 adjoining said shoulder, forms a structural space reserve for receiving an outer acoustic or thermal shielding means for the injection valve 2. This acoustic or thermal shielding means may for example be formed as a shielding cap which is produced from an acoustic foam or from a thermally insulating material and which extends around the injection valve 2. In an alternative embodiment, a holding device 1 with a fully acoustically decoupled injection valve 2 is also conceivable. This may for example be achieved through the introduction of an elastomer layer between the injection valve 2 and the holding device 1.

The holding device 1 furthermore has a cooling-water jacket 4 which extends around the receiving section 3 and which is shaped such that, after the holding device 1 has been mounted, said cooling-water jacket 4, together with a corresponding cooling-water jacket 105 of the exhaust-gas burner 100, forms a cooling-water chamber 200 of the exhaust-gas burner 100. In the exemplary embodiment shown here, the cooling-water jacket 4 of the holding device 1 has two partitions 40, 41 which extend outward in a radial direction from the receiving section 3 and which are formed such that the cooling-water jacket 4 is divided by means of the two partitions 40, 41 into two spaces with flow transfer. For inexpensive joining that may be performed for example by laser welding, the cooling-water jacket 4 is, in the region of a connection section 32 which is of hollow cylindrical shape and which is formed at the front end of the receiving section 3, fixedly joined in block form and, in the region of the cooling-water chamber 200, joined in a virtually gap-free manner. For this purpose, adjoining the connection section 32, there is provided a joining stop 33 which is offset inward in an axial direction and which is of annular form. Alternatively, the joining stop 33 of the connection section 32 may also be situated in the region of the cooling-water chamber 200. In the region of a front end 20 of the injection valve 2, which forms an injection valve tip, the holding device 1 is arranged with a sliding fit relative to a firmly fixed guide grille or a combustion chamber of the exhaust-gas burner 100, in order to break up accumulations in the combustion chamber by means of thermomechanically induced relative movements and discharge said accumulations by fluid flow.

As can be seen in FIG. 2, the holding device 1 has two cooling-water line connection means 5, 6 for the connection of two external cooling-water lines. The cooling-water line connection means 5, 6 each comprise a sealing surface 50, 60. Said sealing surfaces 50, 60 are, in the exemplary embodiment shown here, formed as O-ring carriers. Furthermore, the holding device 1 has two connection means 7, 8 for the connection of two burner-internal water lines 106, 107 of an ignition-plug cooling element 108 of the exhaust-gas burner 100. These two latter connection means 7, 8 are, for improved accessibility for welding, arranged on the holding device 1 so as to be exposed to a maximum extent, in order that the thermal energy which is required for the welding, preferably performed by laser welding, and which is introduced there does not flow off into the surrounding component.

As can be seen in particular in FIG. 3, it is moreover the case that two cooling-water connecting lines 9, 10 are integrated into the holding device 1. A first cooling-water connecting line 9 extends from the first cooling-water line connection 5 into the cooling-water jacket 4 of the holding device 1. A second cooling-water connecting line 10 extends between the cooling-water jacket 4 and the first connection means 7 for the burner-internal water lines 106, 107 of the ignition-plug cooling element 108. The two cooling-water connecting lines 9, 10 are formed obliquely and may be drilled, or alternatively also cast, into the holding device 1. Accessibility to the two obliquely running cooling-water connecting lines 9, 10 is realized here.

The holding device 1 furthermore has, in an circling fashion, a substantially fully freestanding welding edge 12 of thin-walled form. This welding edge 12 advantageously prevents distortion of the seat geometry of the injection valve 2 and of the sealing surfaces 50, 60, which are formed in the present case as O-ring carriers, during the welding-on of the outer shells 101a, 101b of the housing 101 of the exhaust-gas burner 100.

As can be seen from FIG. 2, the holding device 1 furthermore has, on its rear side, two mutually spaced-apart connection means 13a, 13b for a fuel holder, and two mutually spaced-apart connection means 14a, 14b for a burner holder.

What is claimed:

1. A holding device for an injection valve of an exhaust-gas burner of a motor vehicle, said holding device comprising:
   a receiving section that is shaped to receive a front end of the injection valve,
   a cooling-water jacket that extends around the receiving section and that is shaped such that, after the holding device has been mounted on the exhaust-gas burner, said cooling-water jacket, together with a corresponding cooling-water jacket of the exhaust-gas burner, form a cooling-water chamber of the exhaust-gas burner, and
   two connectors that are configured for connecting the cooling water jacket of the holding device to two burner-internal water lines of an ignition-plug cooling element of the exhaust-gas burner.

2. The holding device as claimed in claim 1, wherein the cooling-water jacket of the holding device has two partitions which are formed such that the cooling-water jacket is divided by the two partitions into two spaces with flow transfer.

3. The holding device as claimed in claim 1, wherein the holding device is a cast part.

4. The holding device as claimed in claim 1, wherein the holding device has, in encircling fashion, a fully freestanding welding edge of thin-walled form.

5. The holding device as claimed in claim 1, wherein, at an inner end of the receiving section, there is formed an annular shoulder which, together with an encircling wall adjoining said annular shoulder, forms a structural space reserve for receiving an outer acoustic or thermal shield for the injection valve.

6. The holding device as claimed in claim 1, wherein the holding device has two cooling-water line connectors for the connection of two external cooling-water lines, wherein the cooling-water line connectors each comprise a sealing surface which is formed as an O-ring carrier.

7. An exhaust-gas burner for a motor vehicle, said exhaust-gas burner comprising:
   a housing having an interior defining a combustion chamber,
   an inlet line and an outlet line which are each fluidically connected to the combustion chamber, wherein, during operation of the exhaust-gas burner, the inlet line is configured to receive and transfer a fluid into the combustion chamber,
   an injection valve which opens into the combustion chamber and by means of which a defined fuel quantity is injected with a defined injection frequency into the combustion chamber during operation of the exhaust-gas burner,
   a holding device of claim 1 holding the injection valve, and
   an ignition device which extends into the combustion chamber and which is configured to ignite and thus burn a fuel-process air mixture within the combustion chamber, wherein a gas formed during a combustion process flows through the outlet line and passes out of the exhaust-gas burner.

8. The exhaust-gas burner as claimed in claim 7, wherein the holding device is, in a region of the front end of the injection valve, arranged with a sliding fit relative to a firmly fixed guide grille of the exhaust-gas burner.

9. A motor vehicle comprising the exhaust-gas burner as claimed in claim 7.

10. A motor vehicle comprising the holding device as claimed in claim 7.

* * * * *